US010354375B2

United States Patent
Sato (10) Patent No.: US 10,354,375 B2
(45) Date of Patent: Jul. 16, 2019

(54) METHOD OF UTILIZING INFORMATION ON SHAPE OF FREQUENCY DISTRIBUTION OF INSPECTION RESULT IN A PATTERN INSPECTION APPARATUS

(71) Applicant: NGR Inc., Yokohama (JP)

(72) Inventor: Yoshishige Sato, Yokohama (JP)

(73) Assignee: NGR INC., Yokohama (JP)

( * ) Notice: Subject to any disclaimer, the term of this patent is extended or adjusted under 35 U.S.C. 154(b) by 123 days.

(21) Appl. No.: 15/196,218

(22) Filed: Jun. 29, 2016

(65) Prior Publication Data

US 2018/0005366 A1   Jan. 4, 2018

(51) Int. Cl.
 *G06T 7/00* (2017.01)
 *G06K 9/46* (2006.01)
 *G06K 9/62* (2006.01)

(52) U.S. Cl.
 CPC .......... *G06T 7/0006* (2013.01); *G06K 9/4642* (2013.01); *G06K 9/6212* (2013.01); *G06K 9/6267* (2013.01); *G06T 7/0004* (2013.01); *G06T 2207/10061* (2013.01); *G06T 2207/30148* (2013.01)

(58) Field of Classification Search
 None
 See application file for complete search history.

(56) References Cited

U.S. PATENT DOCUMENTS

| 2002/0145112 A1* | 10/2002 | Davidson | G01N 23/225 250/307 |
| 2006/0222232 A1* | 10/2006 | Ishikawa | G06T 7/0004 382/141 |
| 2008/0130982 A1* | 6/2008 | Kitamura | G06K 9/00 382/144 |
| 2009/0218491 A1* | 9/2009 | Morokuma | G01B 15/04 250/310 |
| 2010/0106447 A1* | 4/2010 | Yamada | G01N 21/95607 702/117 |
| 2012/0324407 A1* | 12/2012 | Matsunawa | G03F 7/705 716/55 |

\* cited by examiner

*Primary Examiner* — Delomia L Gilliard
(74) *Attorney, Agent, or Firm* — Lathrop Gage LLP

(57) ABSTRACT

A pattern inspection method includes: generating an image of an inspection area including a pattern to be inspected; obtaining, from the image, measured values representing two-dimensional shape information of the pattern to be inspected; producing a frequency distribution of the measured values; calculating a statistic of the measured values; calculating a change in the statistic while carrying out an inspection operation which comprises repeating the processes from generating the image to calculating the statistic; and terminating the inspection operation if the change in the statistic is smaller than a threshold value.

3 Claims, 10 Drawing Sheets

NORMAL DISTRIBUTION

FIG. 3B

SKIRT TYPE

FIG. 3C

VARIATION TYPE

FIG. 3D

PLURAL PEAK TYPE

FIG. 3E

SMALL ISOLATED ISLAND TYPE

METHOD OF UTILIZING INFORMATION ON SHAPE OF FREQUENCY DISTRIBUTION OF INSPECTION RESULT IN A PATTERN INSPECTION APPARATUS

BACKGROUND

The present invention relates to a pattern inspection apparatus and a pattern inspection method, and more particularly to a pattern inspection apparatus and a pattern inspection method for inspecting fine patterns of semiconductor integrated circuits (or LSI), liquid crystal panels, and their photomasks (reticles) which have been fabricated on the basis of, for example, design data.

An optical pattern inspection apparatus, which uses a die-to-die comparison method, is used for a wafer pattern inspection in a semiconductor integrated circuit manufacturing process or for a pattern inspection of photomask that forms wafer patterns. The die-to-die comparison method is a technique of detecting a defect by comparing an image of a semiconductor device, which is referred to as a die to be inspected, with an image obtained at the same position in an adjacent die.

On the other hand, for the inspection of a photomask (reticle) having no adjacent die, a die-to-database comparison method has been used. In this die-to-database comparison method, mask data are converted into an image. The image is then used for a substitution of the image of the adjacent die used in the die-to-die comparison method, and inspection is performed in the same manner as the above. The mask data are data obtained by applying photomask correction to design data. The technology concerned is disclosed, for example, in U.S. Pat. No. 5,563,702, "Automated photomask inspection apparatus and method."

However, when the die-to-database comparison method is used for wafer inspection, corner roundness of a pattern actually formed on a wafer is likely to be detected as a defect. In the inspection of a photomask, a pretreatment, which adds corner roundness to the image converted from the mask data by applying a smoothing filter, prevents the corner roundness of the pattern from being detected as the defect. However, in the inspection of a wafer, because the corner roundness added by the pretreatment may be different from corner roundness of each pattern actually formed on the wafer, the pretreatment may not perfectly prevent the corner roundness of the pattern from being detected as the defect. Therefore, an allowable pattern deformation quantity should be set in order to ignore the above difference. As a result, a problem in which a fine defect existing in a place except a corner cannot be detected has happened.

From a viewpoint of problems in semiconductor integrated circuit fabrication, repeated defects (systematic defects) are more important issue than a random defect caused by a particle or the like. The repeated defects are defined as defects that occur repeatedly over all dies on a wafer caused by photomask failure, or the like. Because the repeated defects occur in a die to-be-inspected and in adjacent dies that are to be compared with the die to-be-inspected, the die-to-die comparison wafer inspection cannot detect the repeated defects. Accordingly, the die-to-database comparison wafer inspection has been demanded.

With regard to the number of data required in the die-to-database comparison method for the systematic defects and in the die-to-die comparison method for the random defects, inspection and measurement are carried out until several thousands to several millions or more of data are obtained, in order to statistically express an outcome of a semiconductor process.

However, it is difficult to accurately know, prior to the inspection and measurement, the number of data of several thousands to several millions or more which are required for statistically determining a CD (Critical Dimension) value, a representative value of two-dimensional pattern shape information, or a shape of a frequency distribution of detected defects, or for calculating an incidence rate of defect. For this reason, data, which may be more than necessary, are obtained while the pattern inspection is carried out. For example, a document 1 "Guidelines for measurement sampling properly to maintain and to manage method of semiconductor wafer fabrication processes" refers to the need for increasing the number of data in case a stability of a processing capability is unknown. However, it is difficult to know such a processing capability prior to the inspection and measurement.

The conventional die-to-die comparison method is unable to inspect whether an OPC pattern effectively serves to correct a wafer pattern. Therefore, there has been a demand for its solution, e.g., a technique for comparing and verifying a wafer pattern with design data in consideration of an allowable pattern deformation quantity.

In addition, in a multi-product and small-volume fabricating process, e.g. a system-on-a-chip (SoC) fabricating process, a short delivery time is required. In such a case, if the systematic defect is detected in electric inspection as a final inspection, a short delivery time cannot be achieved. In order to solve this problem, it is necessary to monitor a difference between a pattern formed on a wafer and design data in each stage of the lithography process. Thus, it is necessary for an inspection method to set an allowable pattern deformation quantity that does not affect an electrical property, and to compare and verify design data and a wafer pattern in consideration of deformation within the allowable pattern deformation quantity.

At present, a design check is carried out by a lithography simulator or the like for evaluating pattern deformation. In order to verify the validity of the simulation, it is necessary to prepare a means for comparing and examining a pattern (or a simulation pattern) outputted from the lithography simulator and an actual pattern.

Further, it is more and more important to improve the technology of circuit designing by determining a pattern deformation quantity relative to design data.

In the meanwhile, at present, a CD-SEM (Critical Dimension Scanning Electron Microscope) is used for controlling the pattern width of the wafer in the manufacturing process of semiconductor integrated circuits. This CD-SEM carries out automatic measurement of the line width of a straight line pattern at a specified position using a line profile for each transfer unit of the stepper called a shot. This measurement is performed in several positions for several shots on several pieces of the wafers for one lot, and whether a transfer function of the stepper is normal can be controlled in units of nm (nanometers).

As control items of the circuit pattern, shrink in an endpoint of the wiring, a position of an isolated pattern and the like are also important besides the line width, but the automatic measuring function of the CD-SEM allows only one dimensional measurement. Specifically, the CD-SEM can measure only the length such as the line width. Consequently, the measurement of those two-dimensional shapes is conducted by the operator's visual inspection of the images obtained by the CD-SEM or other microscopes.

The optical proximity effect correction (OPC) plays an important role not only to secure the line width of the straight line pattern but also to form shapes of the corners and isolated patterns. Furthermore, because of improvement of an operating frequency, presently, the control of the shape of a top end or base of the gate wiring pattern, called an endcap or a field extension, respectively, also becomes important in addition to the gate line width.

Such shape measurement of two-dimensional patterns is essential both in the sampling inspection in the manufacturing process and in a trial production phase. Especially in the trial production phase, it is necessary to inspect the pattern formation on the whole wafer.

The automatic length measuring function of the CD-SEM is performed only with a small number of measurement points on the wafer surface, and the measured values cannot be used to provide a representative value of the shape measurement of two-dimensional pattern.

As a result, there is a need for mass CD (Critical Dimension) measurement for measuring several thousand points to several million points or more.

The result of the mass CD (Critical Dimension) measurement is expressed as a frequency distribution, whose shape is not always a normal distribution. Accordingly, it may be difficult to process its statistic as it is. For example, a document 2 "Hot spot management through design based metrology: measurement and filtering" discloses a case where a shape of a frequency distribution of results of mass CD (Critical Dimension) measurement is different from a normal distribution due to the influences of a pattern design.

SUMMARY OF THE INVENTION

An object of an embodiment of the present invention is to divide data using any design information and inspection information in accordance with identical pattern, inspection area, desired design size, etc. in order to treat a statistic of mass CD (Critical Dimension) measurement results.

An object of an embodiment of the present invention is to determine the number of peaks in a shape of a frequency distribution of mass CD (Critical Dimension) measurement results.

An object of an embodiment of the present invention is to determine a skewness which is defined as a skirt type in a shape of a frequency distribution of mass CD (Critical Dimension) measurement results.

An object of an embodiment of the present invention is to detect whether there are outliers which are defined as a small isolated island type in a shape of a frequency distribution of mass CD (Critical Dimension) measurement results.

An object of an embodiment of the present invention is to define, using a kurtosis, a shape of a variation type of a frequency distribution of mass CD (Critical Dimension) measurement results.

An object of an embodiment of the present invention is to define a lower limit value and an upper limit value for each of individual data, an average value, a median value, and a dispersion value of mass CD (Critical Dimension) measurement results and to decide whether the measurement results fall within a standard.

An object of an embodiment of the present invention is to score a shape of a distribution with respect to each inspection area, in a case where the shape of the frequency distribution of mass CD (Critical Dimension) measurement results indicates a normal distribution, a skirt type, or a variation type, and to focus measurement on areas whose shape of distribution deviates from normal distribution so that an inspection time can be shortened.

An object of an embodiment of the present invention is to score a shape of a distribution with respect to each inspection area while measurement is being performed, in a case where the shape of the frequency distribution of mass CD (Critical Dimension) measurement results indicates a normal distribution, a skirt type, or a variation type, so that an optimum number of measurement points can be calculated without carrying out unnecessary measurement.

An object of an embodiment of the present invention is to focus inspection on a region where defects have occurred frequently so that an inspection time can be shortened. The region is a preset region, such as a shot, a die, or a cell.

In an embodiment, there is provided a pattern inspection method comprising: generating an image of an inspection area including a pattern to be inspected; obtaining, from the image, measured values representing two-dimensional shape information of the pattern to be inspected; producing a frequency distribution of the measured values; calculating a statistic of the measured values; calculating a change in the statistic while carrying out an inspection operation which comprises repeating the processes from generating the image to calculating the statistic; and terminating the inspection operation if the change in the statistic is smaller than a threshold value.

In an embodiment, the pattern inspection method further comprises classifying the measured values according to pattern information using design data if there are a plurality of peaks in the frequency distribution or there are outliers in the frequency distribution.

In an embodiment, the two-dimensional shape information of the pattern to be inspected is a Critical Dimension value of the pattern to be inspected or a representative value of two-dimensional pattern shape information.

In an embodiment, the design data include at least one pattern information selected from a group consisting of a line width of the pattern to be inspected, a direction of the pattern to be inspected, a length of the pattern to be inspected, a space width between the pattern to be inspected and a pattern adjacent to the pattern to be inspected, and design coordinates.

In an embodiment, there is provided a pattern inspection method comprising: selecting a plurality of data-trend investigation areas from a plurality of inspection areas; generating an image of each one of the plurality of data-trend investigation areas; obtaining, from the image, measured values representing two-dimensional shape information of the pattern to be inspected; calculating a characteristic index value representing a characteristic of the measured values; and if a difference in the characteristic index value between the plurality of data-trend investigation areas exceeds a threshold value, inspecting an inspection area that is located between the plurality of data-trend investigation areas, and if the difference in the characteristic index value does not exceed the threshold value, inspecting an inspection area that has been designated in advance among the plurality of inspection areas.

In an embodiment, the characteristic index value is a statistic of the measured values or an incidence rate of defect of the pattern to be inspected.

In an embodiment, the two-dimensional shape information of the pattern to be inspected is a Critical Dimensional value of the pattern to be inspected or a representative value of two-dimensional pattern shape information.

According to the above-described embodiments of the present invention, it is possible to automatically judge whether the number of data of inspection results is statistically sufficient by quantitatively evaluating CD (Critical Dimension) value, two-dimensional pattern shape information, a shape of a frequency distribution of the numbers of detected defects, etc., thus making it possible to optimize an inspection time. In addition, the inspection time can be optimized by selectively inspecting areas where defects have occurred frequently. The above-described embodiments of the present invention are applicable to any inspection technique.

DESCRIPTION OF EMBODIMENTS

Hereafter, with reference to the drawings, embodiments of the present invention will be described in detail.

Figure 1:
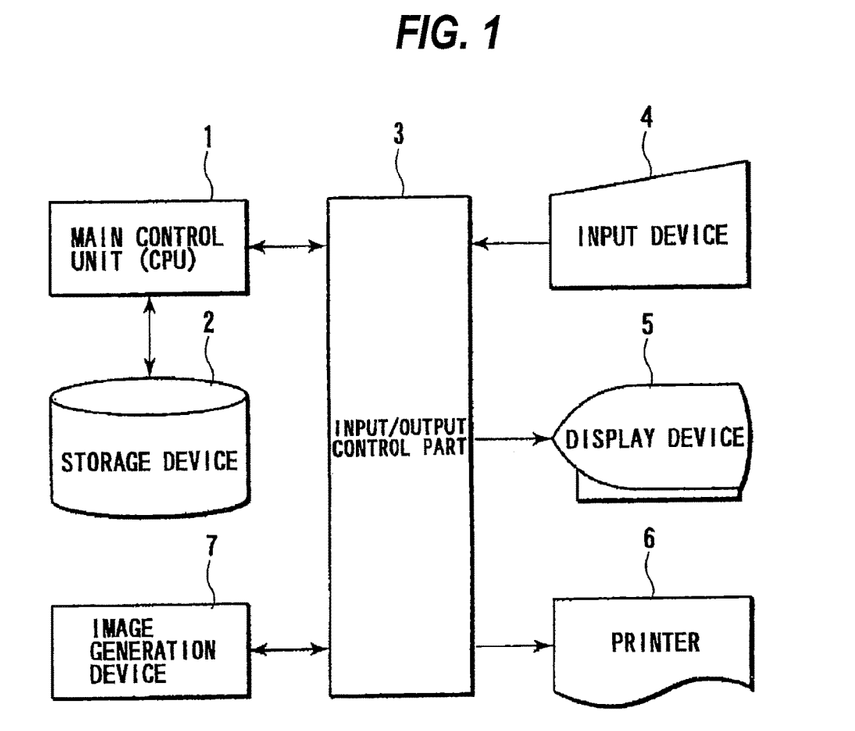
FIG. 1 is a schematic diagram showing an embodiment of a pattern inspection apparatus.

FIG. 1 is a schematic diagram showing an embodiment of a pattern inspection apparatus. The pattern inspection apparatus according to this embodiment comprises a main control unit 1, a storage device 2, an input/output control unit 3, an input device 4, a display device 5, a printer 6, and an image generation device 7.

The main control unit 1 comprises a CPU (Central Processing Unit), and manages and controls the whole apparatus. The main control unit 1 is coupled to the storage device 2. The storage device 2 may be in the form of a hard disk drive, a flexible disk drive, an optical disk drive, or the like. The input device 4 such as a keyboard and a mouse, the display device 5 such as a display for displaying input data, calculation results, and the like, and the printer 6 for printing the calculation results and the like are coupled to the main control unit 1 through the input/output control unit 3.

The main control unit 1 has an internal memory (internal storage device) for storing a control program such as an OS (Operating System), a program for the pattern inspection, necessary data, and the like. The main control unit 1 is configured to realize the pattern inspection with these programs. These programs can be initially stored in a flexible disk, an optical disk, or the like, read and stored in a memory, a hard disk, and the like before execution, and then executed.

Figure 2:
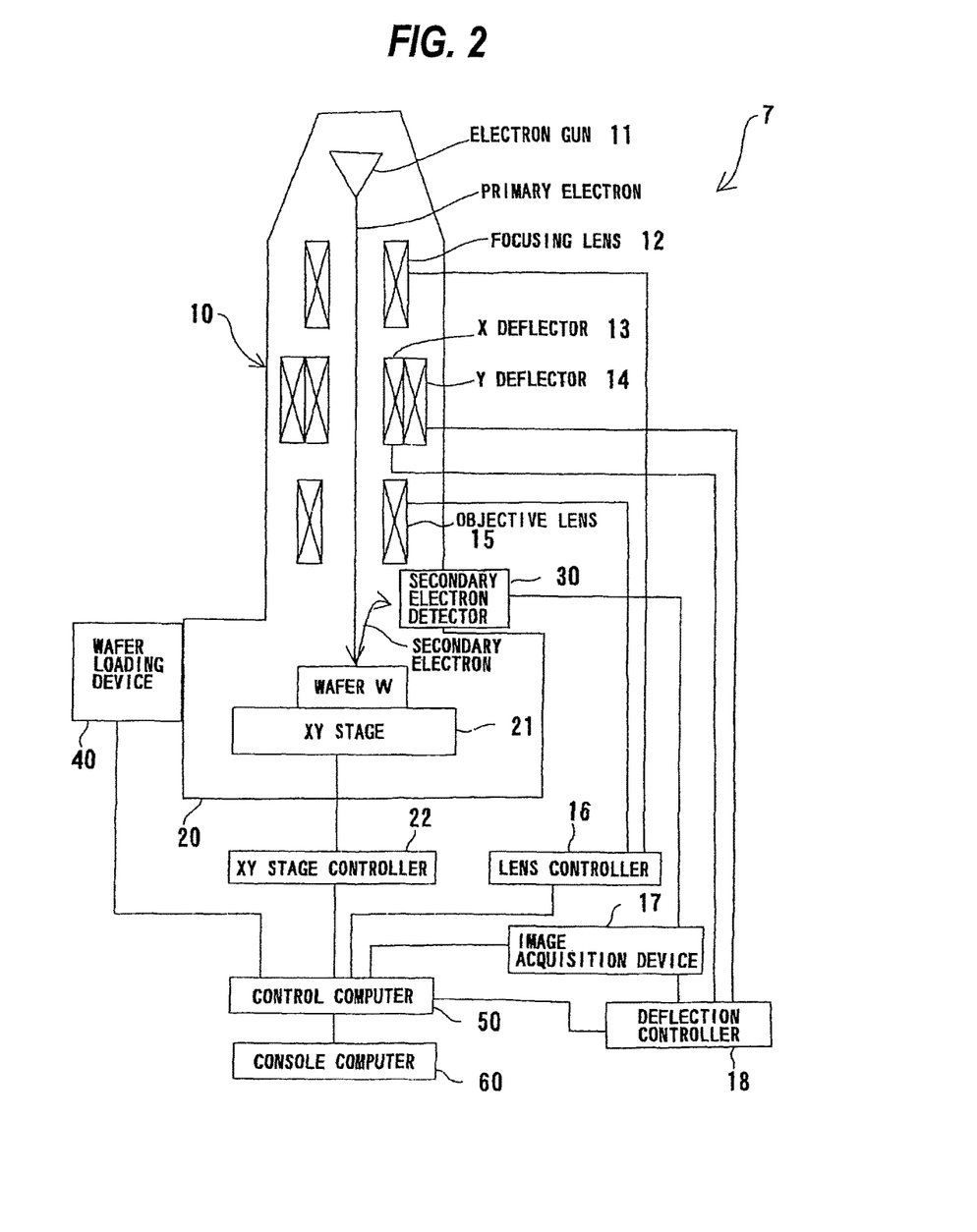
FIG. 2 is a schematic diagram showing an embodiment of an image generation device of the pattern inspection apparatus.

FIG. 2 is a schematic diagram of an embodiment of the image generation device 7 of the pattern inspection apparatus. As shown in FIG. 2, the image generation device 7 includes an irradiation system 10, a specimen chamber 20, and a secondary electron detector 30. In this embodiment, the image generation device 7 comprises a scanning electron microscope.

The irradiation system 10 includes an electron gun 11, a focusing lens 12 for focusing primary electrons emitted from the electron gun 11, an X deflector 13 and a Y deflector 14 for deflecting an electron beam (charged-particle beam) in the X direction and the Y direction, respectively, and an objective lens 15. The specimen chamber 20 has an XY stage 21 which is movable in the X direction and the Y direction. A wafer W, which is a specimen, can be loaded into and unloaded from the specimen chamber 20 by a wafer-loading device 40.

In the irradiation system 10, primary electrons emitted from the electron gun 11 are focused by the focusing lens 12, deflected by the X deflector 13 and the Y deflector 14, and focused and applied by the objective lens 15 to the surface of the wafer W.

When the primary electrons strike the wafer W, the wafer W emits secondary electrons. These secondary electrons are detected by the secondary electron detector 30. The focusing lens 12 and the objective lens 15 are coupled to a lens controller 16, which is coupled to a control computer 50. The secondary electron detector 30 is coupled to an image acquisition device 17, which is also coupled to the control computer 50. Intensity of the secondary electrons detected by the secondary electron detector 30 is converted into an image of a pattern to-be-inspected by the image acquisition device 17. A field of view is defined as the largest region where the primary electrons are applied and an image without distortion can be acquired.

The X deflector 13 and the Y deflector 14 are coupled to a deflection controller 18, which is also coupled to the control computer 50. The XY stage 21 is coupled to an XY stage controller 22. This XY stage controller 22 is also coupled to the control computer 50. The wafer-loading device 40 is also coupled to the control computer 50. The control computer 50 is coupled to a console computer 60.

Figure 3A:
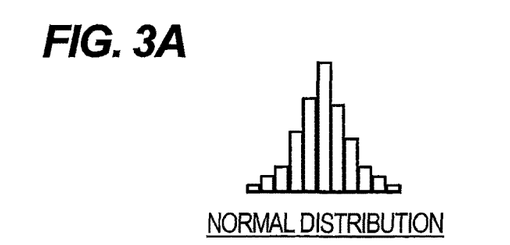
FIGS. 3A, 3B, 3C, 3D, and 3E are diagrams each showing a type of a shape of a frequency distribution.
Figure 3B:
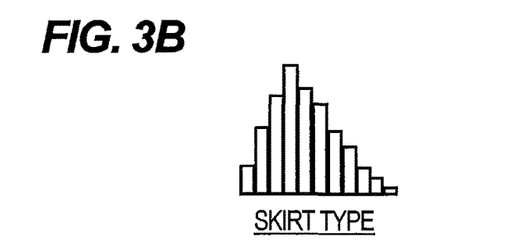
Figure 3C:
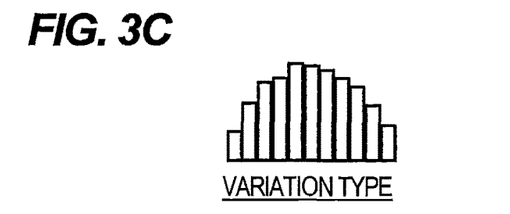
Figure 3D:
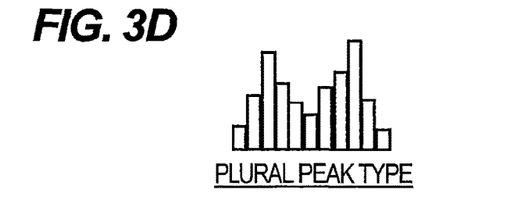
Figure 3E:
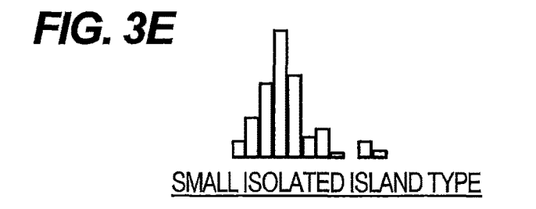

FIGS. 3A through 3E are histograms showing definitions of shapes of frequency distributions to be dealt with in an embodiment of the present invention. As shown in FIGS. 3A through 3E, the shapes of the frequency distributions are defined in five types. FIG. 3B shows a shape of a frequency distribution defined as a skirt type. This skirt type refers to a shape of a frequency distribution having a skewness larger than preset upper and lower limit values of skewness. FIG. 3C shows a shape of a frequency distribution defined as a variation type. This variation type refers to a shape of a frequency distribution having a kurtosis larger than preset upper and lower limit values of kurtosis. FIG. 3D shows a shape of a frequency distribution defined as a plural-peak type. This plural-peak type refers to a shape of a frequency distribution having two or more peaks. FIG. 3E shows a shape of a frequency distribution defined as a small isolated island type. This small isolated island type refers to a shape of a frequency distribution containing outliers. A shape of a frequency distribution which does not meet the definitions of the four types shown in FIGS. 3B through 3E is defined as a normal distribution as shown in FIG. 3A.

Figure 4:
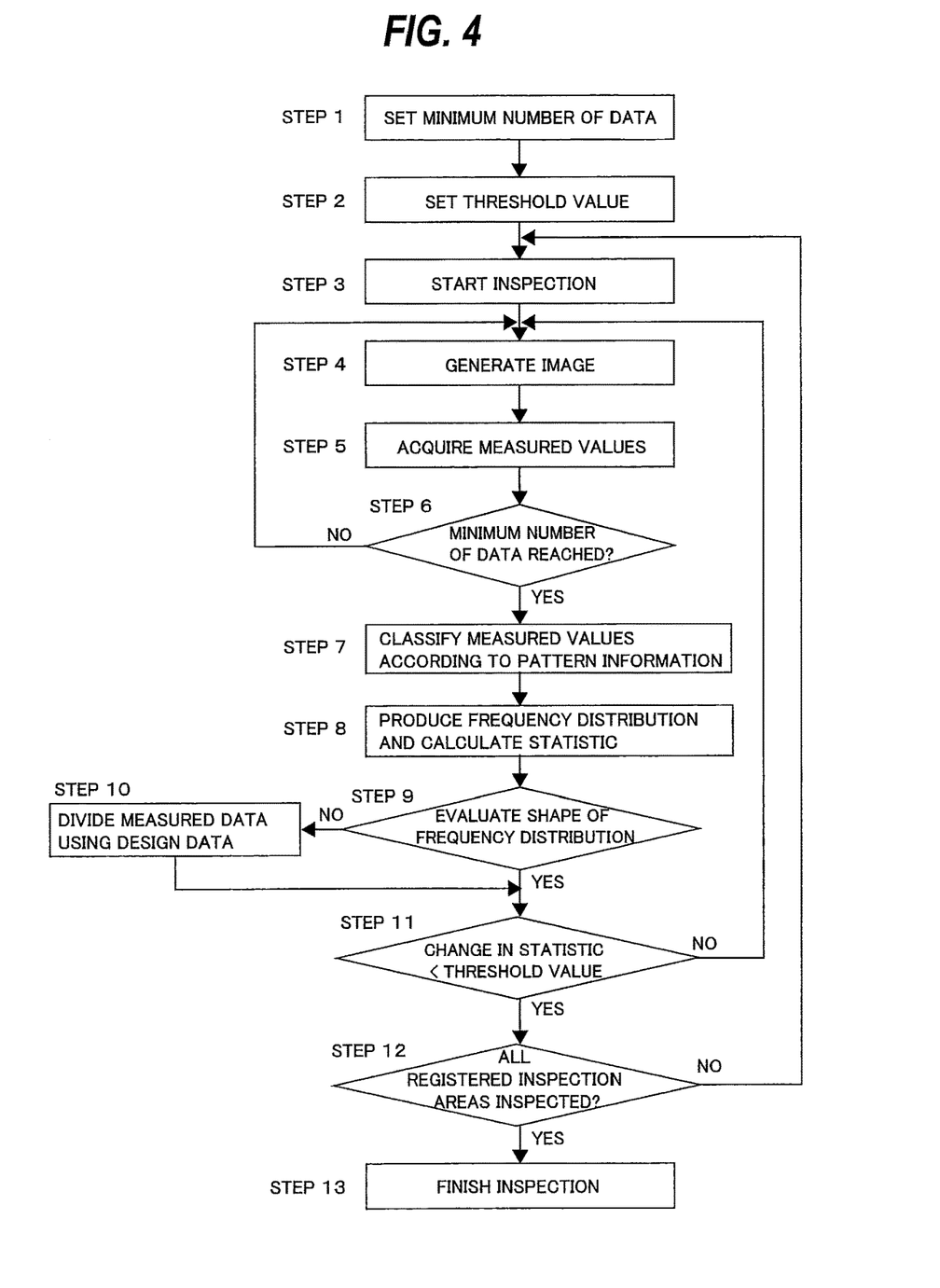
FIG. 4 is a flowchart showing an embodiment of optimization of the number of data.

FIG. 4 is a flowchart showing an embodiment of optimization of the number of data. Inspection and measurement are carried out in a designated inspection area (e.g., a shot, a die, a cell, or the like) according to a conventional manner, until a preset number of data is reached. Specifically, a minimum number of data, which are necessary for statistical processing, is set (step 1). Next, threshold values, which are used as various decision standards, are set (step 2). The threshold values may include a threshold value for determining a change in a statistic, which will be described later.

Subsequently, the inspection of the inspection area is started (step 3). Specifically, the main control unit 1 operates the image generation device 7 to generate an image of the inspection area (step 4). According to the present embodiment, the image generation device 7 comprises a scanning electron microscope. The main control unit 1 obtains the image generated by the image generation device 7, and obtains, from this image, measured values representing two-dimensional shape information of a pattern to be inspected that exists in the inspection area (step 5). An example of the two-dimensional shape information of the pattern to be inspected may be a Critical Dimension (CD) of the pattern to be inspected, or a representative value of the two-dimensional pattern shape information, such as the center of gravity of the pattern. The generation of the image in the step 4 and the obtaining of the measured values in the step 5 are repeated until the number of measured values reaches the above-mentioned minimum number of data (step 6).

The main control unit 1 classifies the measured values according the pattern information, using design data (step 7). As the design data, data obtained by modifying layout data that is represented by the GDSII (Graphic Design System II) data stream format through layer merging or fracturing can be used. The design data include at least one pattern information selected from a group consisting of a line width of the pattern to be inspected, a direction of the pattern to be inspected, a length of the pattern to be inspected, a space width between the pattern to be inspected and a pattern adjacent to the pattern to be inspected, and design coordinates. The reason of classifying the measured values according to the pattern information is to minimize a variation of the measured values to bring a frequency distribution of the measured values to be generated in next step 8 as close to a normal distribution as possible.

The main control unit 1 produces a frequency distribution of the classified measured values and calculates a statistic of the classified measured values (step 8). The statistic includes at least one of an average value, a dispersion, a maximum value, a minimum value, a skewness, and a kurtosis.

The skewness is calculated according to the following known formula.

$$\text{Skewness} = \frac{\sum_{i=1}^{N}(x_i - \bar{x})^3}{N\sigma^3}$$

The kurtosis is calculated according to the following known formula.

$$\text{Kurtosis} = \frac{\sum_{i=1}^{N}(x_i - \bar{x})^4}{N\sigma^4}$$

The main control unit 1 evaluates the shape of the frequency distribution, i.e., the shape of the histogram (step 9). Specifically, the main control unit 1 determines whether the shape of the frequency distribution belongs to a first group consisting of the normal distribution, the skirt type, and the variation type shown in FIGS. 3A through 3C or a second group consisting of the plural-peak type and the small isolated island type shown in FIGS. 3D and 3E. If the shape of the frequency distribution is of the plural-peak type or the small isolated island type (i.e., NO in step 9), then the main control unit 1 further classifies the data of the measured values, which have been already classified in step 7, according to the pattern information using the design data, and evaluates the shape of the frequency distribution again (step 10). If the shape of the frequency distribution has two or more peaks even though the design data are used or if the shape of the frequency distribution is of the small isolated island type, then no reduction in the number of inspection and measurement operations is carried out.

If the shape of the frequency distribution is of the normal distribution, the skirt type, or the variation type (i.e., YES in step 9), the main control unit 1 compares a change in the statistic of the frequency distribution, such as the skewness or kurtosis, with the threshold value that has been set in the step 2 (step 11). If the change in the statistic is larger than the threshold value, the processes from the step 4 to the step 11 are repeated. Each time a statistic is calculated in step 8, the statistic is updated. If the change in the statistic is smaller than the threshold value, then the main control unit 1 determines whether all inspection areas, registered in advance by a recipe, have been inspected (step 12). If all of the inspection areas have not yet been inspected, another inspection area is inspected according to the same processes. If all of the inspection areas have been inspected, the inspection is terminated (step 13).

Figure 5:
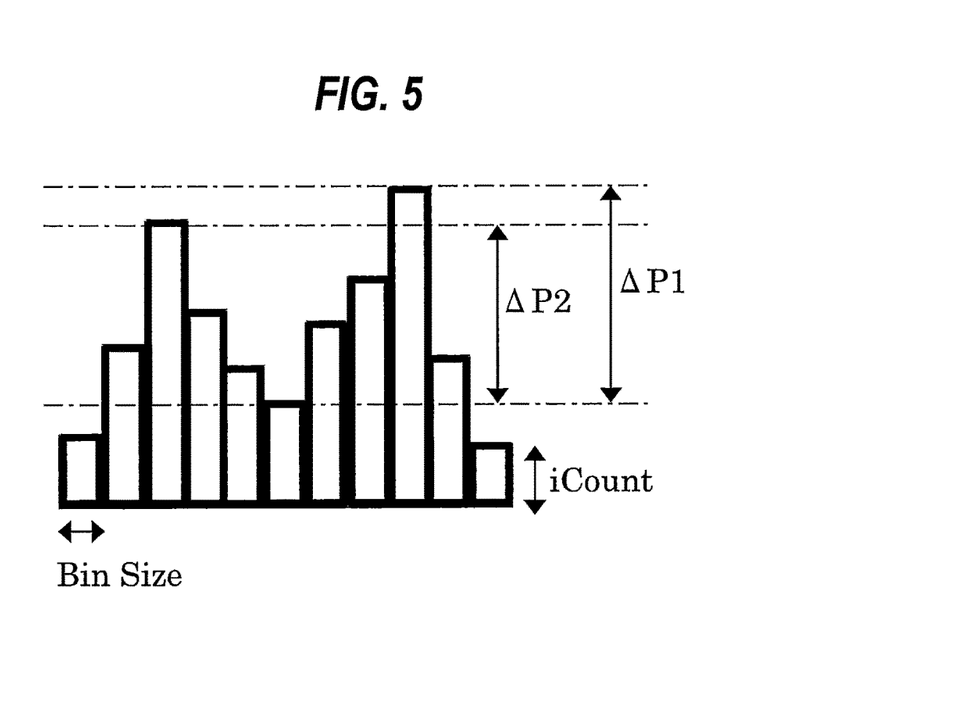
FIG. 5 is a diagram showing a process of determining a shape of a frequency distribution of a plural-peak type.

FIG. 5 is a diagram showing a process of determining the shape of the frequency distribution of the plural-peak type. In FIG. 5, an example of a frequency distribution (or histogram) of measured values of CD (Critical Dimension) is shown. Where frequencies in respective pre-designated bin sizes are counted in the order of increasing CD (Critical Dimension), an i-th frequency is represented by iCount. If iCount is larger than iCount−1 and smaller than iCount+1, the main control unit 1 recognizes iCount as an upwardly protruding peak. If iCount is smaller than iCount−1 and larger than iCount+1, the main control unit 1 recognizes iCount as a downwardly protruding peak. Whether a frequency is large or small is judged by comparison with a preset minimum change. If the differences ΔP1, ΔP2 between peaks shown in FIG. 5 are larger than the preset minimum change, the frequency distribution shown in FIG. 5 is judged to be the plural-peak type. If the preset minimum change is larger than ΔP2, the frequency distribution is not judged to be the plural-peak type.

Figure 6:
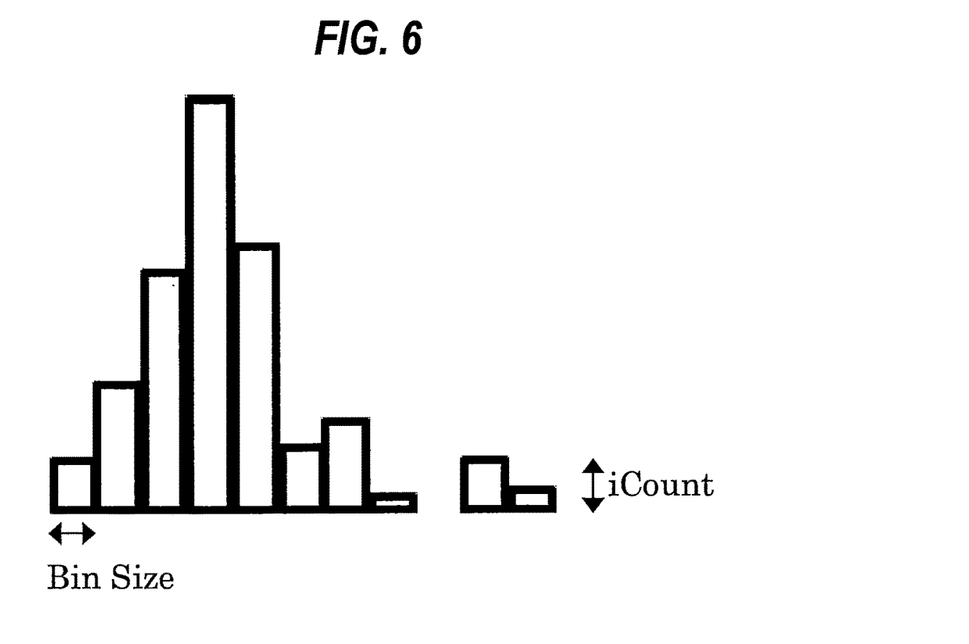
FIG. 6 is a diagram showing a process of determining a shape of a frequency distribution of a small isolated island type.

FIG. 6 is a diagram showing a process of determining a shape of a frequency distribution of the small isolated island type. Where frequencies in respective pre-designated bin sizes are counted in the order of increasing CD (Critical Dimension), an i-th frequency is represented by iCount. If iCount is 0, and iCount−1 and iCount+1 are larger than a preset number, the frequency distribution shown in FIG. 6 is judged to be the small isolated island type.

Figure 7:
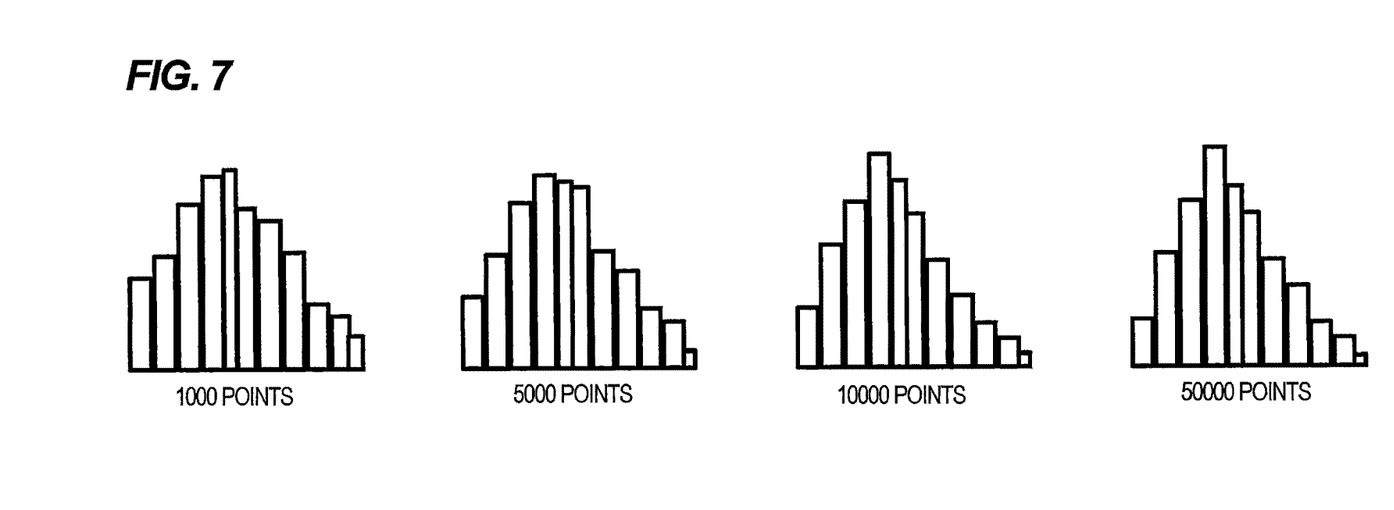
FIG. 7 is a set of diagrams showing an embodiment of optimization of the number of length-measurement data.

FIG. 7 is a set of diagrams showing an embodiment of the optimization of the number of length measurement data. Specifically, FIG. 7 illustrates an example showing relationships between the number of data and skewness. In this example, a difference between skewnesses calculated from two data groups of ten thousand data and fifty thousand data does not exceed a preset threshold value. On the other hand, a difference between skewnesses calculated from data groups of five thousand data and ten thousand data exceeds the preset threshold value. According to the above-described embodiment, the main control unit 1 updates a statistic each time the length measurement is performed, and, when a change in the statistic becomes smaller than the threshold value, i.e., when a substantial change in the frequency distribution shape information is stopped, the main control unit 1 determines that the optimum number of data has been reached, and the main control unit 1 terminates the inspection of that inspection area.

If it is determined that the result of the length measurement has reached the optimum number of data in FIG. 7, a next inspection area, such as a shot, a die, or a cell, is then inspected in a case where such a next inspection area has been registered by a recipe. If such a next inspection area is not registered by the recipe, the inspection is terminated. If a plurality of inspection areas have been registered, the optimum number of data obtained in the first inspection area may be used in a next inspection area, or the optimum number of data may be calculated each time an inspection area is inspected.

Figure 8:
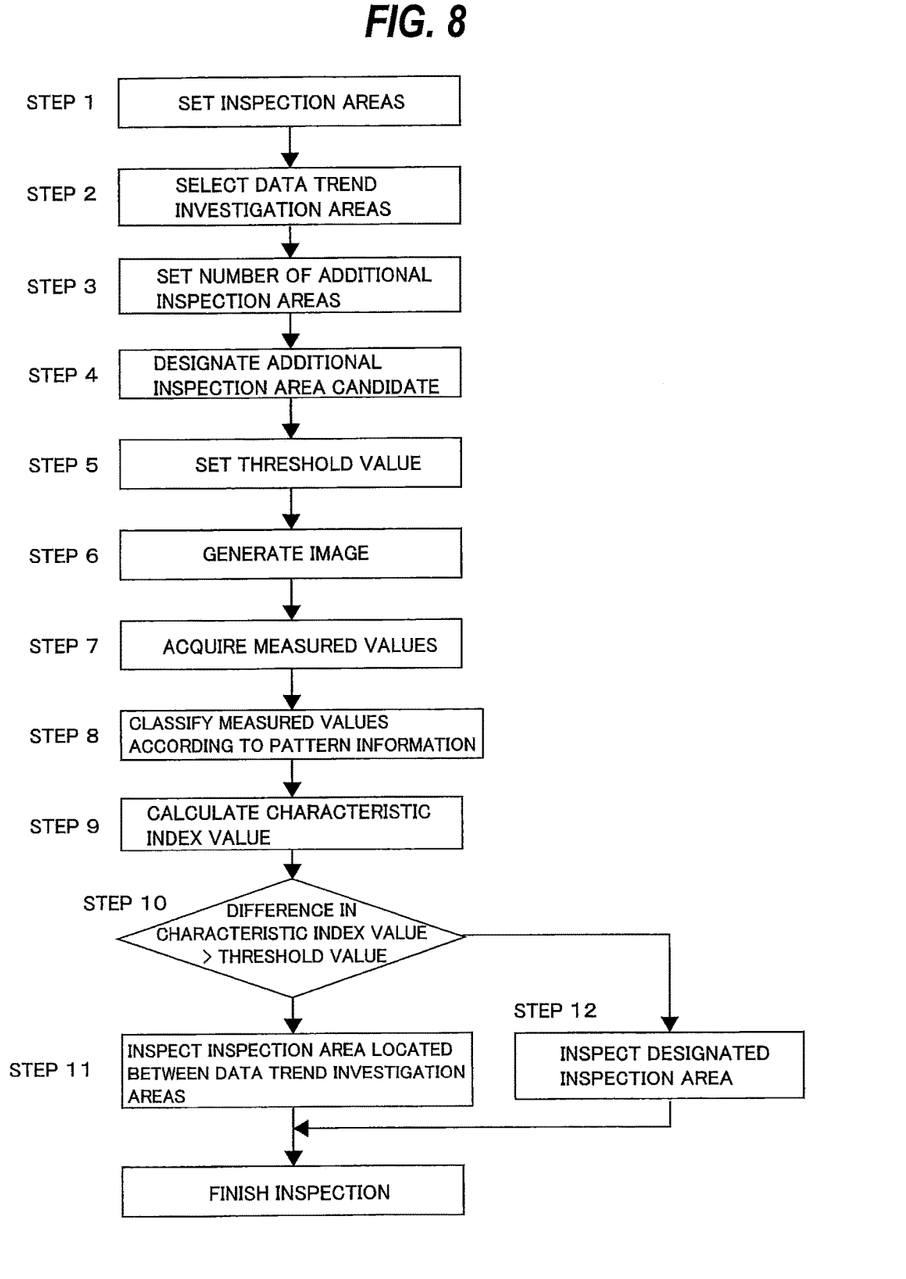
FIG. 8 is a flowchart showing an embodiment of optimization of an inspection area.

FIG. 8 is a flowchart showing an embodiment of the optimization of the inspection area. In step 1, a plurality of inspection areas, each including a pattern to be inspected, are set. In step 2, a plurality of data-trend investigation areas for investigating a trend of data comprising measured values of two-dimensional shape information of the pattern to be inspected are selected from the above-described plurality of inspection areas. In step 3, the number of additional inspection areas to be selected from the plurality of inspection areas that have been set in step 1 is set. In step 4, at least one of the plurality of inspection areas that have been set in step 1 is designated as an additional inspection area candidate.

In step 5, a threshold value which is used for judging the trend of the data is set. In step 6, an image of each data-trend investigation area is generated by the image generation device 7 in each of the data-trend investigation areas. In step 7, the main control unit 1 obtains the image generated by the image generation device 7, and obtains measured values representing two-dimensional shape information of the pattern to be inspected from the image. The generation of the image in step 6 and the obtaining of the measured values in step 7 are carried out a plurality of times in each of the data-trend investigation areas. An example of the two-dimensional shape information of the pattern to be inspected may be Critical Dimension (CD) of the pattern to be inspected or a representative value of two-dimensional pattern shape information, such as the center of gravity of the pattern. The main control unit 1 classifies the measured values, obtained in each of the data-trend investigation areas, according to the pattern information using design data (step 8), and then calculates a characteristic index value representing a characteristic of the classified measured values (step 9). Examples of the characteristic index value may include an incidence rate of pattern defect, and a statistic (e.g., an average value, a dispersion, a maximum value, a minimum value, a skewness, or a kurtosis) of the measured values.

The main control unit 1 compares a difference in the characteristic index value between the data-trend investigation areas with the threshold value that has been set in step 5 (step 10). If the difference in the characteristic index value exceeds the threshold value, an inspection area located between the data-trend investigation areas is inspected (step 11). Specifically, the image generation device 7 generates an image of the inspection area located between the data-trend investigation areas. The main control unit 1 obtains the image generated by the image generation device 7, and obtains measured values representing two-dimensional shape information of the pattern to be inspected from this image. The generation of the image and the obtaining of the measured values are repeated a plurality of times. If the difference in the characteristic index value does not exceed the threshold value, the inspection area, which has been designated as the additional inspection area candidate in step 4, is inspected (step 12).

Figure 9:
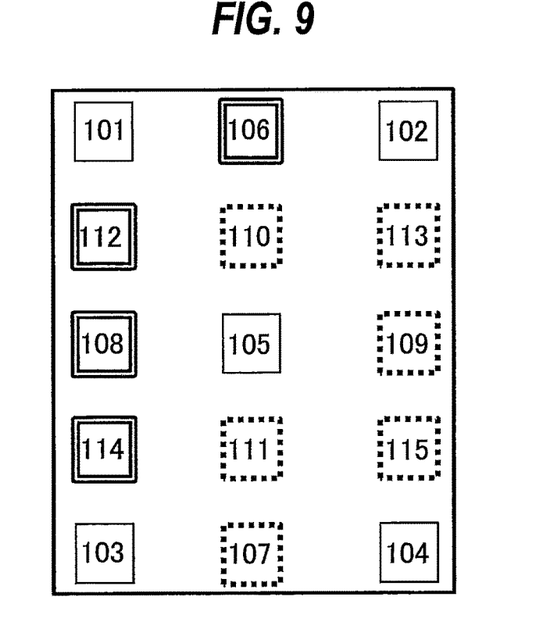
FIG. 9 is a diagram showing an embodiment of optimization of inspection areas using the flowchart shown in FIG. 8.

FIG. 9 is a diagram showing an embodiment of the optimization of inspection areas using the flowchart shown in FIG. 8. In the embodiment shown in FIG. 9, fifteen inspection areas 101 through 115 are set. Of these inspection areas 101 through 115, data-trend investigation areas for investigating the trend of data are five inspection areas 101 through 105. The number of additional inspection areas is set to four. In this embodiment, the dispersion is used as the characteristic index value representing the characteristic of the measured values belonging to each area.

In the embodiment shown in FIG. 9, a difference in dispersion between the first inspection area 101 and the second inspection area 102, and a difference in dispersion between the first inspection area 101 and the third inspection area 103 are larger than a preset threshold value. Furthermore, the dispersion in the first inspection area 101 is the largest, the dispersion in the third inspection area 103 is the second largest, and the dispersion in the second inspection areas 102 is the third largest. In this case, the three inspection areas 112, 108, 114 that are located between the first inspection area 101 and the third inspection area 103, and the inspection area 106 that is located between the first inspection area 101 and the second inspection area 102 are additionally inspected. These four inspection areas 112, 108, 114, 106 are the additional inspection areas discussed above.

In this embodiment, the inspection areas 107, 109, 110, 111, 113, 115 are not inspected and measured. Therefore, a time required for the inspection and the measurement can be reduced by 40%, compared with a time required for inspecting and measuring all of the inspection areas 101 to 115.

Figure 10:
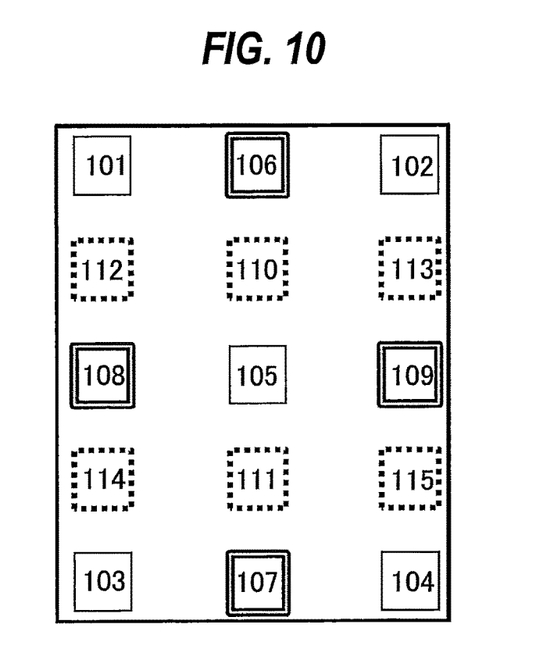
FIG. 10 is a diagram showing another embodiment of the optimization of the inspection areas.

FIG. 10 is a diagram showing another embodiment of the optimization of inspection areas. The total number of inspection areas, the data-trend investigation areas, and the number of additional inspection areas are the same as those of the embodiment shown in FIG. 9. In this embodiment, differences in dispersion between the inspection areas 101 to 105 are smaller than a threshold value. In this case, the inspection areas 106, 107, 108, 109, which are pre-designated additional inspection area candidates, are additionally inspected. In this embodiment, the inspection areas 110 through 115 are not inspected and measured.

Figure 11:
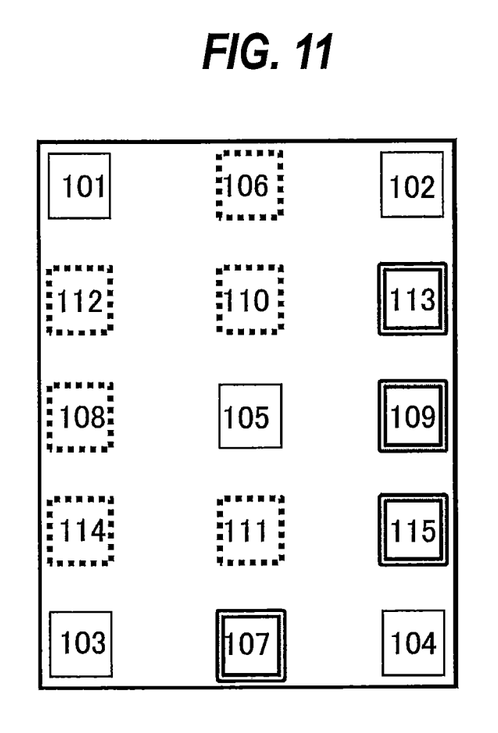
FIG. 11 is a diagram showing an example of the optimization of the inspection areas in a pattern defect inspection.

FIG. 11 is a diagram showing an example of the optimization of inspection areas in a pattern defect inspection. The total number of inspection areas, the data-trend investigation areas, and the number of additional inspection areas are the same as those of the embodiment shown in FIG. 9. In the embodiment shown in FIG. 11, a difference in dispersion between the second inspection area 102 and the fourth inspection area 104, and a difference in dispersion between the third inspection area 103 and the fourth inspection area 104 are larger than a preset threshold value. Furthermore, the detection rate of the pattern defect in the second inspection area 102 is the largest, the detection rate of the pattern defect in the fourth inspection area 104 is the second largest, and the detection rate of the pattern defect in the third inspection areas 103 is the third largest. In this case, three inspection areas 113, 109, 115 that are located between the second inspection area 102 and the fourth inspection area 104, and the inspection area 107 that is located between the third inspection area 103 and the fourth inspection area 104 are additionally inspected. These four inspection areas 113, 107, 109, 115 are the additional inspection areas discussed above.

Figure 12:
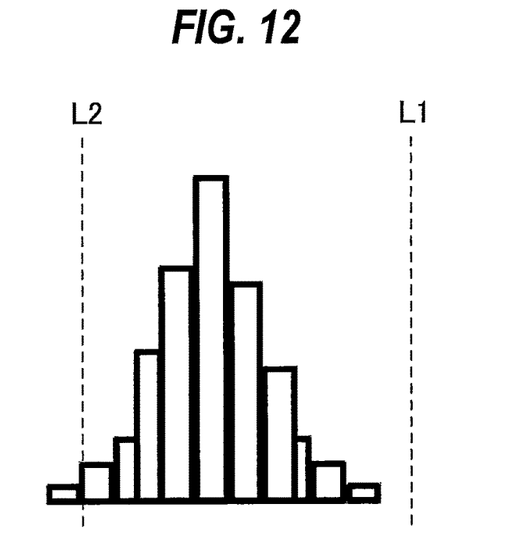
FIG. 12 is a diagram showing an embodiment in which an upper limit value and a lower limit value are set for individual data of mass CD (Critical Dimension)

FIG. 12 is a diagram showing an embodiment in which an upper limit value L1 and a lower limit value L2 are set with respect to individual data of mass CD (Critical Dimension). In this embodiment, a minimum value of the measured length values is smaller than the lower limit value L2. With use of the data shown in FIG. 12, it is possible to calculate what percentage of the total number of data corresponds to the number of data smaller than the lower limit value L2. For example, if the number of data is one million, the number of data smaller than the lower limit value L2 is 150, and the number of data larger than the upper limit value L1 is 0, the trend of mass CD (Critical Dimension) can be determined by the ratio of the data in excess of the limit values L1, L2 to the total number of data.

Figure 13:
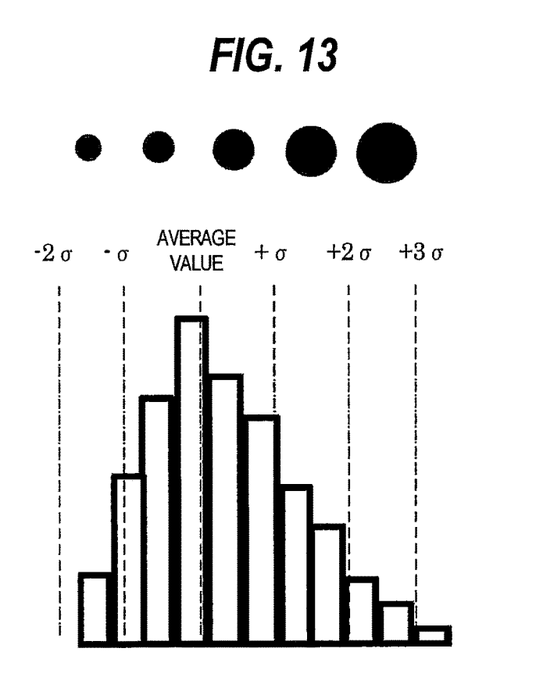
FIG. 13 is a diagram showing an embodiment in which a shape of a frequency distribution of mass CD (Critical Dimension) is expressed by ratios of the numbers of data existing in ranges with average values of ±σ, 2σ, 3σ to the total number of data, with use of mass CD (Critical Dimension) data.

FIG. 13 is a diagram showing an embodiment in which a shape of a frequency distribution of mass CD (Critical Dimension) is expressed by ratios of the numbers of data existing in ranges with average values of ±σ, 2σ, 3σ to the total number of data, with use of mass CD (Critical Dimension) data. In this embodiment, data equal to or larger than the average value+3σ exist, whereas data equal to or smaller than the average value −3σ do not exist. Using the existence ratios in the respective data zones, the symmetry of the mass CD (Critical Dimension) data can be confirmed. The main control unit 1 shown in FIG. 1 has a function to cause the display device 5 to display representative SEM images in the respective CD ranges and to also cause the display device 5 to display measurement position information as auxiliary information of selected SEM images.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A pattern inspection method comprising:
    selecting a plurality of data-trend investigation areas from a plurality of inspection areas;
    generating an image of each one of the plurality of data-trend investigation areas;
    obtaining, from the image, measured values representing two-dimensional shape information of a pattern to be inspected;
    calculating a characteristic index value representing a characteristic of the measured values; and
    if a difference in the characteristic index value between the plurality of data-trend investigation areas exceeds a threshold value, inspecting an inspection area that is located between the plurality of data-trend investigation areas, and if the difference in the characteristic index value does not exceed the threshold value, inspecting an inspection area that has been designated in advance among the plurality of inspection areas.

2. The pattern inspection method according to claim 1, wherein the characteristic index value is a statistic of the measured values or an incidence rate of defect of the pattern to be inspected.

3. The pattern inspection method according to claim 1, wherein the two-dimensional shape information of the pattern to be inspected is a Critical Dimensional value of the pattern to be inspected or a representative value of two-dimensional pattern shape information.

* * * * *